United States Patent [19]

Nishimura et al.

[11] Patent Number: 4,736,313

[45] Date of Patent: Apr. 5, 1988

[54] DIGITAL INDICATION TYPE LENGTH MEASURING SYSTEM

[75] Inventors: Takeji Nishimura; Hiroshi Koizumi, both of Kawasaki, Japan

[73] Assignee: Mitutoyo Mfg. Co., Ltd., Tokyo, Japan

[21] Appl. No.: 702,511

[22] Filed: Feb. 19, 1985

[30] Foreign Application Priority Data

Feb. 24, 1984 [JP] Japan ................................. 59-33576
Feb. 24, 1984 [JP] Japan ................................. 59-33577

[51] Int. Cl.⁴ ...................... G06F 15/36; G01B 3/18; G01B 7/14
[52] U.S. Cl. .................................... 364/563; 33/140; 33/164 R; 33/1 L; 364/561
[58] Field of Search ............... 364/562, 705, 571, 560, 364/561, 469, 563, 552; 33/1 L, 125 A, 125 C, 140, 143 L, 164 R, 165, 166; 377/19, 24

[56] References Cited

U.S. PATENT DOCUMENTS

| | | | |
|---|---|---|---|
| 4,035,922 | 7/1977 | von Voros | 33/143 L |
| 4,121,292 | 10/1978 | Galanis et al. | 364/469 |
| 4,158,229 | 6/1979 | Woo, Jr. et al. | 364/562 |
| 4,181,959 | 1/1980 | Toteishi | 364/562 |
| 4,255,861 | 3/1981 | Nakata | 33/166 |
| 4,320,577 | 3/1982 | Lauritzen | 33/125 A |
| 4,383,301 | 5/1983 | Morita et al. | 364/562 |
| 4,435,904 | 3/1984 | Logan et al. | 33/143 K |
| 4,495,701 | 1/1985 | Nakadoi | 33/166 |
| 4,578,868 | 1/1986 | Sasaki et al. | 33/166 |

FOREIGN PATENT DOCUMENTS 2731294 1/1979 Fed. Rep. of Germany.
WO82-01064 4/1982 World Int. Prop. O..

OTHER PUBLICATIONS

Pfeifer; "QUAPS- ein System fuer Qualitaetspruefungen"; Industrie No. 75 pp. 34-36; Sep. 19, 1984; with attached informal English translation.
Pfeifer; "MOPS- ein mobiles Pruefsystem"; pp. 31-33; Sep. 19, 1984; with attached informal English translation, Industrie No. 75.

*Primary Examiner*—Felix D. Gruber
*Attorney, Agent, or Firm*—Flynn, Thiel, Boutell & Tanis

[57] ABSTRACT

A digital indication type length measuring system includes a length measuring device having a spindle which can be brought into abutting contact with a work to be measured, an encoder for representing a displacement of the spindle as an electric signal, and an output circuit for outputting measured length information data obtained from the electric signal from the encoder to a cable. A data processing device includes an input circuit coupled to the cable for receiving data from the length measuring device, a processing circuit for processing data received by the input circuit in a predetermined manner to produce quality control data, and a printer for printing out the quality control data. The quality control data includes a histogram. When the length measuring and data processing devices are disconnected from each other, each measured length is displayed on a digital indicator which is provided on the length measuring device and which is repsonsive to the electric signal from the encoder.

11 Claims, 15 Drawing Sheets

|   | d1 | d2 | d3 | d4 | d5 | d6 | d7 | d8 | d9 | d10 | d11 | d12 | d13 |
|---|---|---|---|---|---|---|---|---|---|---|---|---|---|
| (A) | 1111 | 1111 | 1111 | 1111 | 0001 | 0100 | 1000 | 0000 | 1110 | 0110 | 0001 | 1100 | 0000 |
|   | F | F | F | F | 8 | 2 | 1 | 0 | 7 | 6 | 8 | 3 | 0 |

|   | d1 | d2 | d3 | d4 | d5 | d6 | d7 | d8 | d9 | d10 | d11 | d12 | d13 |
|---|---|---|---|---|---|---|---|---|---|---|---|---|---|
| (B) | 1111 | 1111 | 1111 | 1111 | 0000 | 0000 | 0100 | 0000 | 1000 | 1001 | 1001 | 0010 | 0110 |
|   | F | F | F | F | 0 | 0 | 2 | 0 | 1 | 9 | 9 | 4 | 6 |

| DATE | | N | DATE | | N | |
|---|---|---|---|---|---|---|
| MEASURER NO. | | HH.LL.H.L | MEASURER NO. | | HH.LL.H.L | |
| PARTS NO. | | Nd | PARTS NO. | | Nd | 52B |
| UNIT NO. | | Ndj | UNIT NO. | | Ndj | |
| D001 | D002 | | D001 | D002 | | |
| D003 | D004 | | D003 | D004 | | |
| D005 | D006 | | D005 | D006 | | 53B |
| D998 | D999 | | D998 | D999 | | |
| i R x̄ SD FRAD CP | Fj | | i R x̄ SD FRAD CP | Fj | | 54B |
| SET.NO.1 | x̄₁ | R₁ | SET.NO.1 | x̄₁ | R₁ | |
| ♭ 2 | x̄₂ | R₂ | ♭ 2 | x̄₂ | R₂ | |
| ♭ 3 | x̄₃ | R₃ | ♭ 3 | x̄₃ | R₃ | 55B |
| SET.NO.200 | x̄ 200 | R 200 | SET.NO.200 | x̄ 200 | R 200 | |

FIG. 8 (A)

```
INIT  LOAD
8 3 . 1 2 . 2 4  LOAD
5 1 2 3  LOAD
1 0  LOAD
2  LOAD
5 0  LOAD

LIMIT  LOAD
1 . 1  LOAD
0 . 9  LOAD
1 0  LOAD

1 . 0 8  LOAD
0 . 9 2  LOAD
A  B  C  D
DATA
DATA
DATA
DATA
  ⋮
DATA
DATA

PRINT
```

```
DATE:
                    83. 12.24
MEASURER:
                       5123
PARTS NO.
                         10
UNIT NO.
                          2
NO. OF SAMPLINGS:
                         50

UPPER LIMIT VALUE 1
                      1.100 M
LOWER LIMIT VALUE 1
                      0.900 M
NO. OF DIVISION
                         10
CLASS RANGE
                      0.020 M
UPPER LIMIT VALUE 2
                      1.080 M
LOWER LIMIT VALUE 2
                      0.920 M 1     0.976 M
           ▼  2     0.910 M
           ▼  3     0.895 M
              4     1.013 M
              ⋮
           ▲  9     1.104 M
           ▲ 10     1.002 M

RESULT OF STATISTICS:
NO. OF DATA:             10
MAXIMUM VALUE:       1.104 M
MINIMUM VALUE:       0.895 M
DEFLECTION RANGE:    0.209 M
MEAN VALUE:          1.004 M
VARIATION            0.060 M
```

DATA

```
RESULT OF STATISTICS:
NO. OF DADA:          50
MAXIMUM VALUE:     1.104 M
MINIMUM VALUE:     0.895 M
DEFLECTION RANGE:  0.209 M
MEAN VALUE:        1.001 M
VARIATION:         0.037 M

HISTOGRAM:
UPPER LIMIT:       1.100 M
LOWER LIMIT:       0.900 M
NO.OF DIVISION:      10
RANGE:             0.020 M
```

```
-NG   X    <   0900    1
 A   0900  ~   0910    1
 B   0920  ~   0939    1
 C   0940  ~   0959    1
 D   0960  ~   0979    0
 E   0980  ~   0999   11
 F   1000  ~   1019   20
 G   1020  ~   1039    4
 H   1040  ~   1059    3
 I   1060  ~   1079    0
 J   1000  ~   1000    2
+NG  1100  <    X      1
```

FRACTION DEFECTIVE & PROCESS
CAPABILITY:

FRACTION DEFECTIVE:   4.00 %

PROCESS:              0.898

1       0.997 M (A) TOLERANCE DIMENSION (NON-DEFECTIVE)

(B) TOLERANCE DIMENSION (NON-DEFECTIVE)

DIGITAL INDICATION TYPE LENGTH MEASURING SYSTEM

BACKGROUND OF THE INVENTION

1. Field of the Invention

This invention relates to a digital indication type length measuring system having a function of generating quality control data.

2. Description of the Prior Art

In general, so-called direct-reading type length measuring instrument, such as slide calipers, a micrometer and a dial gauge, are utilized in all the industrial fields, and so-called digital indication type length measuring instruments have been more and more increasing in popularity, each of which has provided on a main body thereof an encoder of an optical type, an electrostatic type or the like so as to obtain the advantages of high accuracy measurement and easiness in reading, and is capable of digitally indicating measured results by use of a digital indicator, a cathode-ray tube (CRT) or the like.

Heretofore, with either the direct-reading type length measuring instrument or the digital indication type length measuring instrument, an inspector has had to record the measured results in a note. Consequently, in order to convert the measured results into quality control data, the inspector has had to manually calculate the measured results by use of an electronic calculator or process the measured results by use of a computer.

Consequently, in either case, occurrence of miscalculations has been unavoidable to some extent, whereby the reliability of calculated results has been low. Furthermore, in case of using a calculator, miscalculations occur and, moreover, the operating efficiency is very low, and particularly, personal errors tend to occur with every inspector. On the other hand, in the case of using a computer, there have been many disadvantages, such as that (1) mkstaken inputs tend to occur, (2) since a large-sized computer conducting other processing is used, the result cannot be ascertained at a position close to the spot where measurements are made, and consequently, the result cannot be ascertained until other processings are completed, and (3) on the other hand, during the processing of quality control data, the other processing must be sacrificed therefor.

To obviate the above-described disadvantages, a processing apparatus and a printer may be integrally incorporated in a digital indication type measuring instrument. However, since such a measuring instrument is large-sized in itself, it becomes difficult to conduct the length measuring operation of a work to be measured. Furthermore, a power battery for the instrument becomes short in service life, as a result of which this approach lacks practicability, and further, the actually usable function is restricted, and the fact is that no such measuring instrument has been made.

SUMMARY OF THE INVENTION

An object of the present invention is to provide a digital indication type length measuring system capable of generating quality control data efficiently and accurately while having the characteristic features of being compact in size and easy in handling.

To this end, the present invention contemplates that data producing means for processing quality control data from measured length value and printing the same out is formed separately from a length measuring means having an encoder, and they are connected to each other by a cable.

More specifically, the present invention features the length measuring means including a spindle or the like to be brought into abutting contact with a work to be measured, an encoder for representing a displacement value of this spindle or the like as an electric signal, and an output circuit for data-outputting measured length information obtained from the electric signal of this encoder, and features the data processing means including an input circuit for receiving the output data from the length measuring means, a processing circuit for processing the data received by this input circuit in a predetermined manner to produce quality control data and a recorder for recording processed results and the like, the length measuring and data processing means being connected to each other by a cable for directly transmitting the measured length information from the output circuit of the length measuring means to the input circuit of the data processing means, and the length measuring means having a digital indicator so that, even during disconnection between the length measuring and data processing means, a measured length value can be ascertained from an output signal of the encoder by use of the digital indicator.

BRIEF DESCRIPTION OF THE DRAWINGS

The drawings show an embodiment of the present invention, in which:

FIGS. 4A and 4B are explanatory views showing examples of the data;

DETAILED DESCRIPTION OF THE EMBODIMENT

Figure 1:
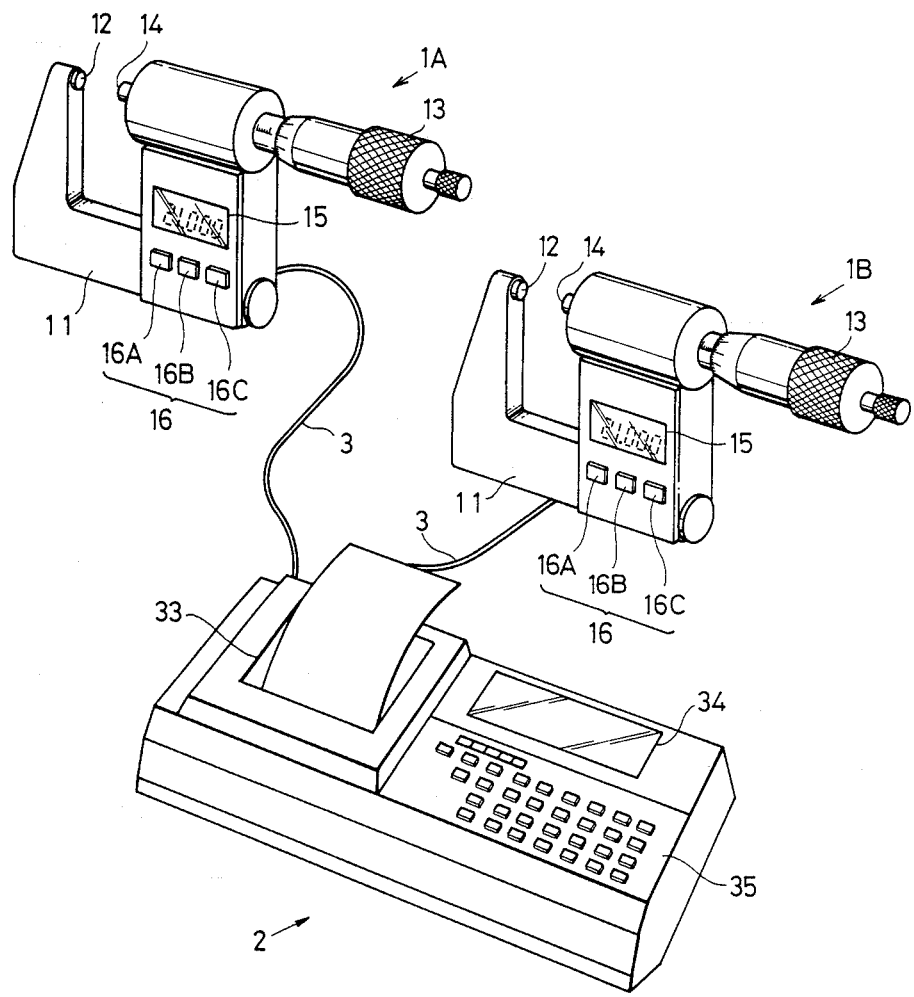
FIG. 1 is a perspective view showing the general appearance.

FIG. 1 shows the appearance of the digital indication type length measuring system of this embodiment. This system is constituted by a plurality of micrometers, or two micrometers 1A and 1B as being the length measuring means in this embodiment, and a data processing device 2 as being the data processing means for successively fetching data of measured length values measured by the respective micrometers 1A and 1B and for producing quality control data, etc. from the data of the measured length values thus fetched. Here, the micrometers 1A, 1B and the data processing device 2 are housed in casings separate of one another, and data-interchangeably connected to one another by a signal transmitting cable 3.

Each of the micrometers 1A and 1B has a U-shaped frame 11. The U-shaped frame 11 is provided at one end thereof with an anvil 12 and at the other end thereof with a spindle 14 being linearly movable to and from the anvil 12 and capable of holding a work in cooperation with the anvil 12. The U-shaped frame 11 is provided at the front thereof and on the side of the spindle 14 with a digital indicator 15 for digitally indicating a displacement value of the spindle 14, namely, a value representing a length or dimension of the work, and various control switches 16. Here, as the control switches 16, there are provided switches of three types including a power switch 16A, a zero clear switch 16B and a hold switch 16C.

Figure 2:
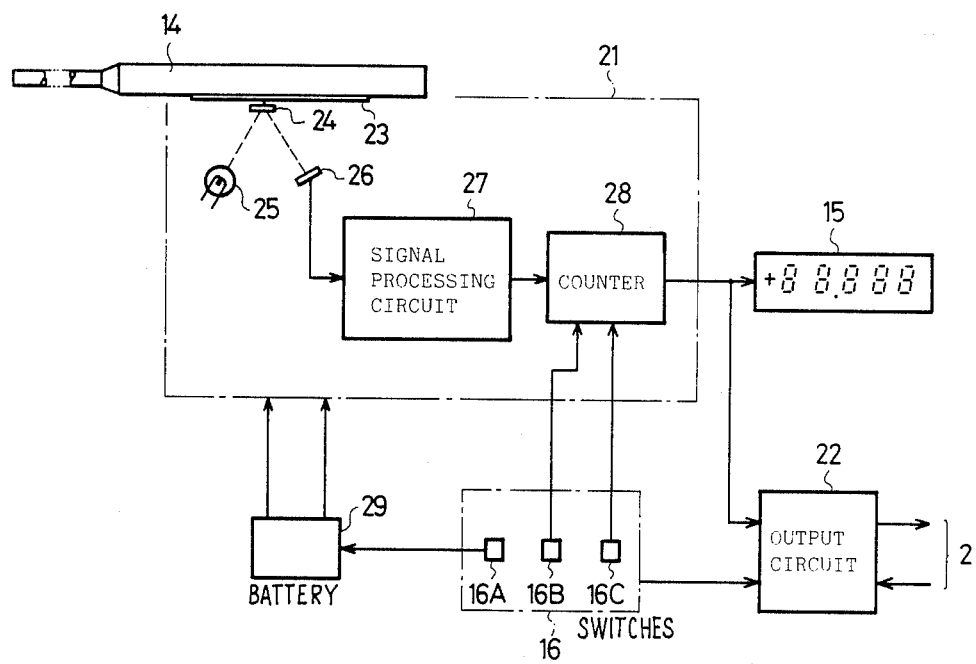
FIG. 2 is a block diagram showing the circuit of the micrometer.

As shown in FIG. 2, in the U-shaped frame 11, there are provided an encoder 21 for representing a displacement value of the spindle 14 as an electric signal and causing the digital indicator 15 to digitally indicate the same, an output circuit 22 for converting various signals from this encoder 21 into BCD (binary coded decimal) coded signals and outputting the same to the data processing device 2 through the signal transmitting cable 3, and a battery 29 or the like for supplying electric power to the encoder 21 through the turn-on of the power switch 16A.

The encoder 21 includes: a main scale 23 provided in the longitudinal direction of the outer periphery of the spindle 14; an index scale 24 opposed to this main scale 23; a light emitting element 25 for irradiating a light to the main scale 23 through this index scale 24; a light receiving element 26 for receiving the light reflected by the main scale 23 through the index scale 24; a signal processing circuit 27 for processing signals from this light receiving element 26 in such predetermined manners as waveform shaping processing to shape a sine-wave signal received by the light receiving element 26 into a rectangular wave for example, split processing, direction discriminating processing, indication unit conversion processing and the like; and a counter 28 for counting outputs from this signal processing circuit 27 and causing the digital indicator 15 to indicate the counted number, i.e. a displacement value of the spindle 14.

Figures 3, 4:
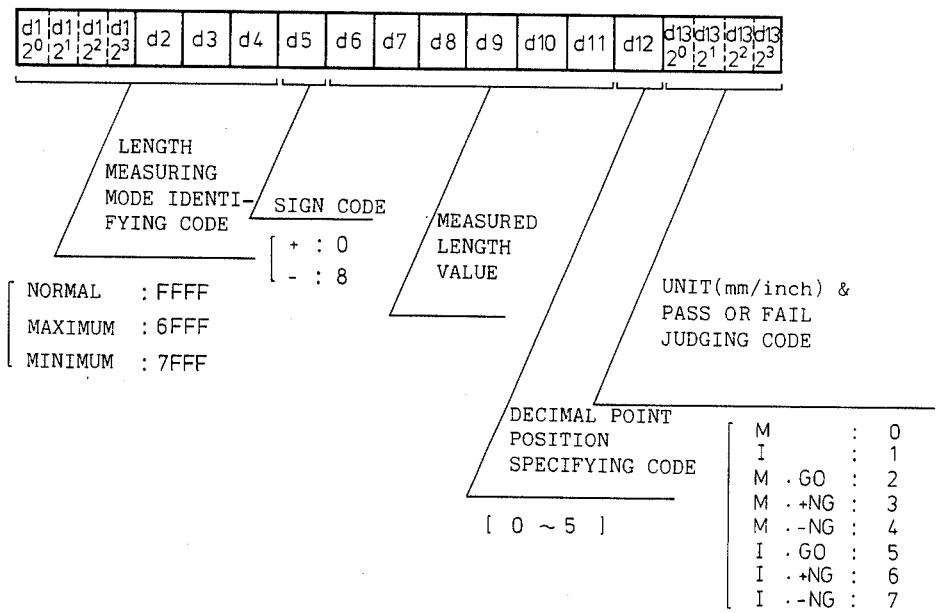
FIG. 3 is an explanatory view showing the format of the transmitted data.

Furthermore, the output circuit 22 converts various data obtained through the operation of the encoder 21 and the control switches 16, i.e. measured length mode information, measured length value information, sign information, decimal point position information and measured length unit information into BCD codes in accordance with data fetch commands from the data processing device 2, and causes the data processing device 2 to output the same in a bit serial manner in synchronism with clock pulses. As shown in FIG. 3, the data are composed of 13 digits $d_1$–$d_{13}$ of 4 bits, and are outputted in a bit serial manner from $2^0$ of $d_1$ to $2^3$ of $d_{13}$ successively. As viewed in format-wise manners, a length measuring mode identifying code for specifying the type of measured length value is set in $d_1$–$d_4$, a sign code for specifying the direction of increase or decrease of the measured length value is set in $d_5$, the measured length value is set in $d_6$–$d_{11}$, a decimal point position specifying code is set in $d_{12}$, and a unit and pass-or-fail judging code is set in $d_{13}$.

Here, the length measuring mode identifying code is set as "FFFF" in the case of a normal measured length value such as in the micrometers 1A and 1B, set as "6FFF" in the case of the maximum hold value in a length measuring instrument having the maximum value hold function, and set as "7FFF" in the case of the minimum hold value in a length measuring instrument having the minimum hold function. Furthermore, the sign code is set as "0" in the case of + and set as "8" in the case of −. The decimal point position specifying code is set in a sequence of "0"–"5" as the decimal point position is transferred from the minimum significance place to upper significance places. Further, the unit and pass or fail judging code is set in a sequence of "0"–"7" in accordance with the pass or fail judging data in appropriate units, including a millimeter unit and an inch unit. For example, changes are made as shown in FIG. 4(A) in the case of a normal measured length value—210.768 (mm) and as shown in FIG. 4(B) in the case of a normal measured length value 2.0199 (inch), respectively.

Figure 5:
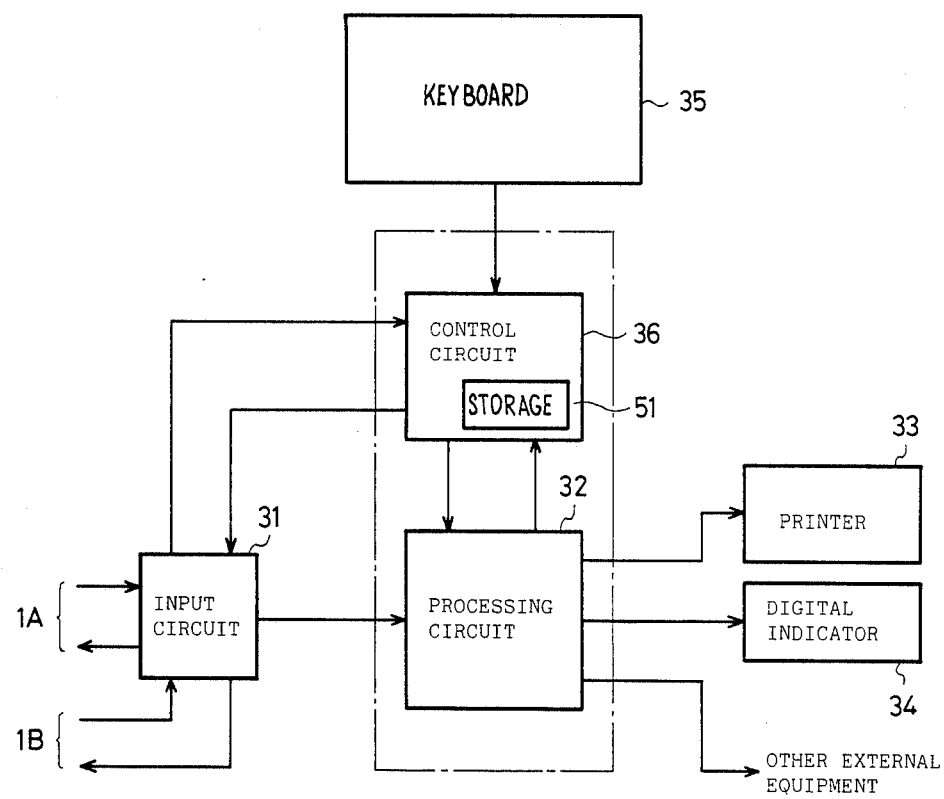
FIG. 5 is a block diagram showing the circuit of the data processing device.

On the other hand, as shown in FIG. 5, the data processing device 2 includes: an input circuit 31 for receiving signals transmitted through the signal transmitting cable 3 from the output circuits 22 of the micrometers 1A and 1B; a processing circuit 32 for processing data received by this input circuit 31 in predetermined steps to produce quality control data; a printer 33 and a digital indicator 34 serve the listing device for printing and indicating the data from this processing circuit 32; a keyboard 35; and a control circuit 36 for causing the processing circuit 32 to operate in predetermined steps, in response to a command from the keyboard 35.

Figures 6, 7:
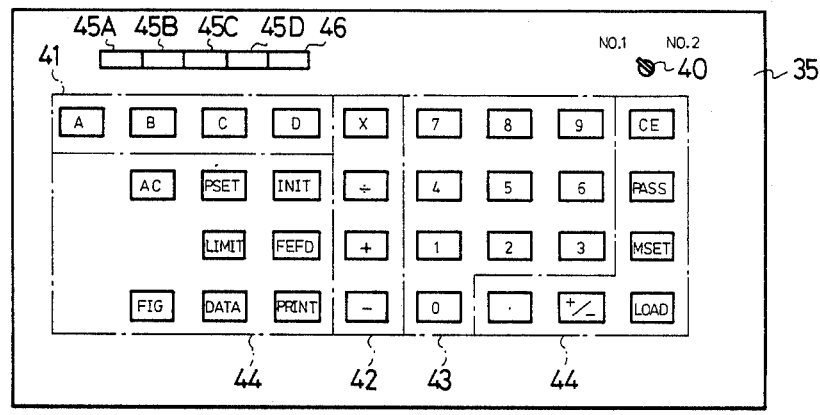
FIG. 6 is a front view showing the keyboard.
FIG. 7 is an explanatory view showing the contents of the storage section.

As shown FIG. 6, the keyboard 35 has a measuring instrument selection key 40 for selecting either the micrometer 1A or 1B, print selection keys 41 of "A"–"D", processing keys 42 including "×", "÷", "+" and "−", ten keys 43 of "0"–"9", various function keys 44, four print data indication lamps 45A–45D associated with the print selection keys 41 of "A"–"D", respectively, and a limited value setting indication lamp 46 associated with a "limit" key out of the function keys 44.

Here, when the "A" key out of the print selection keys 41 is pressed, the print data indication lamp 45A is turned on, and the print of the measured length value data is suppressed or excluded. When the "B" key is pressed, the print data indication lamp 45B is turned on and the print of the result of statistics sought from the measured length value data is excluded. When the "C" key is pressed, the print data indication lamp 45C is turned on and the print of the histogram data generated from the measured length value data is excluded. When the "D" key is pressed, the print data indication lamp 45D is turned on and a fraction defective FRA.D and a process capability exponent C.P data are excluded. On the other hand, as the function keys 44, there are provided an all clear key "AC", a preset key "PSET", an initial key "INIT", a limit key "LIMIT", a feed key "FEED" a listing key "FIG", a data fetch key "DATA", a print key "PRINT", a cancel key "CE", a pass key "PASS", a memory set key "MSET", a load key "LOAD", a decimal point setting key ".", a sign change key "+/−" and the like.

Furthermore, the control circuit 36 incorporates therein a storage section 51 for storing set data from the keyboard 35, the measured length value data transmitted from the micrometers 1A or 1B and the like, and successively fetches the measured length value data measured by the micrometers 1A or 1B in response to commands from the keyboard 35, and thereafter calculates quality control data from these measured length value data in accordance with predetermined steps and outputs the result to the printer 33. As shown in FIG. 7, the micrometers 1A and 1B are respectively allotted thereto with set data storing areas 52A and 52B, measured length value data storing areas 53A and 53B, processing data storing areas 54A and 54B and control chart data storing areas 55A and 55B. In the respective set data storing areas 52A and 52B, there are arbitrarily set and stored a date, a measurer No., a parts No., a unit No., a number of samplings N, first upper and lower limit values (normally, upper and lower limit values of a tolerance dimension) HH, LL, second upper and lower limit values H, L set within the tolerance dimension rather than the upper and lower limit values HH and LL, a number of division $N_d$ for dividing equally the range between the first upper and lower limit values HH and LL, a divided section $N_{dj}$ divided equally by the number of division $N_d$ and the like. Furthermore, in the respective measured length value data storing areas 53A and 53B, there are successively stored measured length values of 1–1000 fetched into the data processing device 2 from the respective micrometers 1A and 1B. Furthermore, in the respective processed data storing areas 54A and 54B, there are stored a number of data i of the measured length value data $D_i$ fetched into the data processing device 2, frequencies $F_j$ of the divided sections $N_{dj}$, to which the measured length value data $D_i$ belongs, and further, the data produced by the processing circuit 32 such for example as a mean value data $\overline{X}$, a range of deflection R, a standard deviation S.D., a fraction defective FRA.D, a process capability exponent C.P and the like. Further, in the respective control chart data storing areas 55A and 55B, there are successively stored a mean value data $\overline{X}_k$ and a deflection range $R_k$, which are produced by the processing circuit 32 and added thereto with set Nos.

Figure 8B:
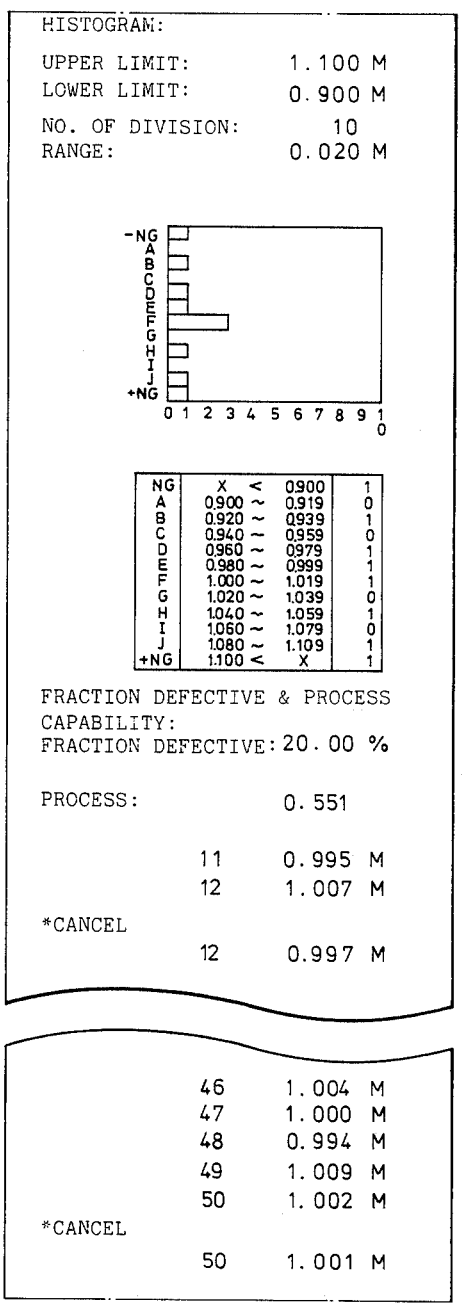
FIGS. 8(A), (B) and (C) are views showing examples of key operations and samples of prints.
Figure 8C:
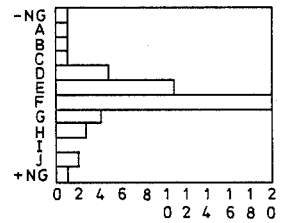

Description will hereunder be given of the operation of this embodiment. In conducting a measurement, firstly, a setting operation is performed. In the setting operation, either one of the micrometers, the micrometer 1A for example, is selected by the measuring instrument selection switch 40, and thereafter, as shown in FIG. 8, when data such as year, month, day and the like are inputted by the initial key "INIT", load key "LOAD", and decimal point setting key "." of the function keys 44 and the ten keys 43, when the measurer No., parts No., unit No. and number of samplings N are inputted by the ten keys 43 and load key "LOAD" and when, the first and second upper and lower limit values HH, LL, H, L and the number of division $N_d$ for equally dividing the range between the first upper and lower limit values HH and LL are inputted by the ten keys 43, limit key "LIMIT" and load key "LOAD", successively, the data are stored by the set data storing area 52A of the control circuit 36 selected by the measuring instrument selection switch 40 and are successively printed out by the printer 33. In this case, after the print of the number of division $N_d$, a value obtained by dividing the range between the first upper and lower limit values HH and LL by the number of division $N_d$, i.e. a class range of one divided section $N_{dj}$, is printed, and the range with every divided section $N_{dj}$ is determined. Furthermore, the limit value setting indication lamp 46 is turned on by the operation of the limit key "LIMIT".

Additionally, when the first and second upper and lower limit values HH, LL, H and L are not set, a skip can be made to the subsequent operation by the operation of the pass key "PASS".

Subsequently, data not needing printing are specified by the print selection keys 41. In this case, to omit the print of the measured length data, the key "A" is to be pressed, to omit the print of the result of statistics, the key "B" is to be pressed, to omit the print of the histogram, the key "C" is to be pressed, and, to omit the print of the fraction defective FRA.D and the process capability exponent C.P, the key "D" is to be pressed, respectively. In this case, when the key "A" is pressed, the print data indication lamp 45A is turned on, when the key "B" is turned on, the print data indication lamp 45B is turned on, when the key "C" is pressed, the print data indication lamp 45C is turned on, and, when the key "D" is pressed, the print data indication lamp 45D is turned on, respectively. In consequence, from the turn-on conditions of these lamps, it is discernible what data are omitted in printing.

Now, upon the completion of the setting operation as described above, the turn-on of the power switch 16A of the micrometer 1A causes the digital indicator 15 to indicate data from the encoder 21, i.e. a displacement value of the spindle 14. Here, an operator operates the zero clear switch 16B in the condition where the spindle 14 is brought into a predetermined position, e.g. a position where the spindle 14 is abutted against the anvil 12, whereby the counted number in the counter 28 is cleared to zero, and thereafter, the spindle 14 is moved in accordance with the work to be measured.

When the spindle 14 moves, a sine-wave signal is detected by the light receiving element 26 in accordance with an optical change generated between the main scale 23 and the index scale 24. The signal detected by the light receiving element 26 is processed by the signal processing circuit 27 in a predetermined manner, and thereafter, counted by the counter 28. The number counted by the counter 28, i.e. the distance of the spindle 14 from the anvil 12 is digitally indicated by the digital indicator 15, and is delivered to the output circuit 22

Figure 9A:
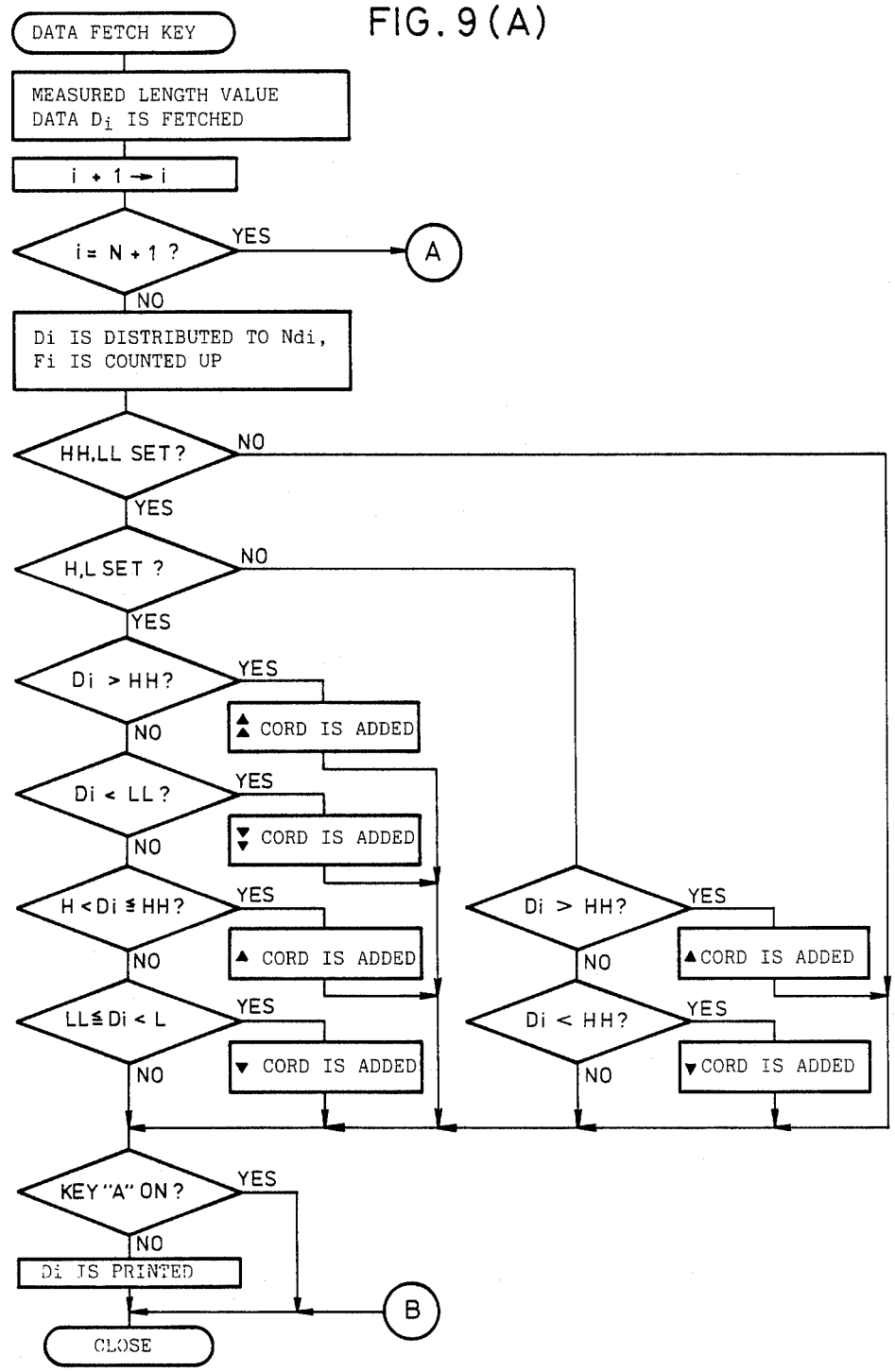
FIGS. 9(A) and (B) are flow charts showing the operations initiated by the data fetch key.
Figure 9B:
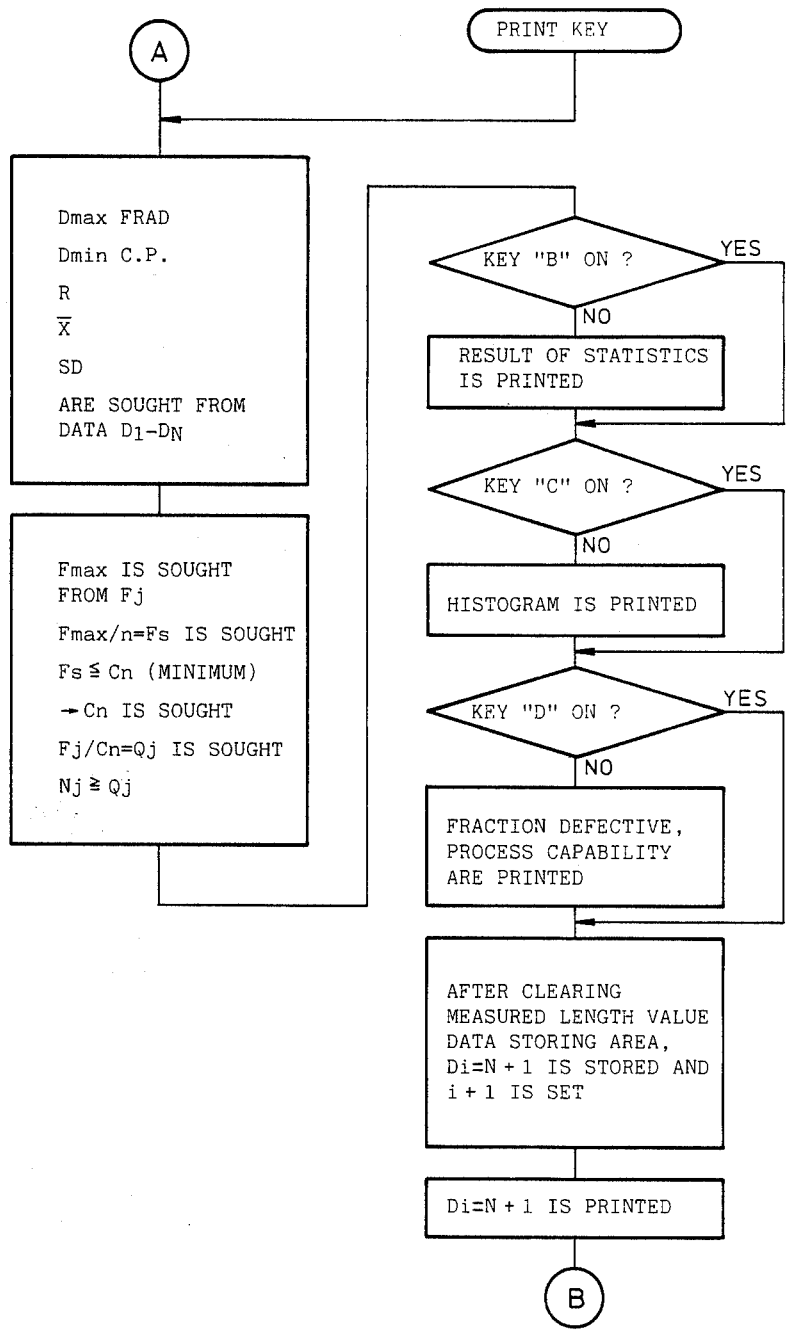

Now, under the conditions where the spindle 14 is moved and the work is clamped between the anvil 12 and the spindle 14, if the data fetch key "DATA" of the data processing device 2 is pressed, then the processing is performed in the control circuit 36 in accordance with the flow chart shown in FIG. 9. More specifically, if a data fetch command is delivered from the control circuit 36 to the output circuit 22 of the micrometer 1A, then, in the output circuit 22, the various data delivered from the encoder 21, namely, the measured length mode information, measured length value information, sign information, decimal point position information, length measuring unit and pass-or-fail information are converted into BCD coded signals, and thereafter, transmitted in a bit serial manner to the data processing device 2 in synchronism with clock pulses from the data processing device 2. Then, in the data processing device 2, the measured length value data $D_i$, which has been transmitted from the output circuit 22, is fetched, the number of data i is counted up by +1, and thereafter, judgment is made as to whether the number of data i has reached a number obtained by adding 1 to the number of samplings N (N+1) or not. Here, until the number of data i of the measured length value data $D_i$ fetched into the data processing device 2 reaches (N+1), judgment is made as to which divided section $N_{dj}$ of the tolerance dimensions equally divided by the number of division $N_d$ the measured length value data $D_i$ belongs to, the frequency $F_j$ corresponding to the divided section $N_{dj}$ to which the measured length value data $D_i$ belongs is counted up by $+1$, and thereafter, judgments are successively made as to whether the first upper and lower limit values HH, LL and the second upper and lower limit values H, L are set or not.

Figure 10:
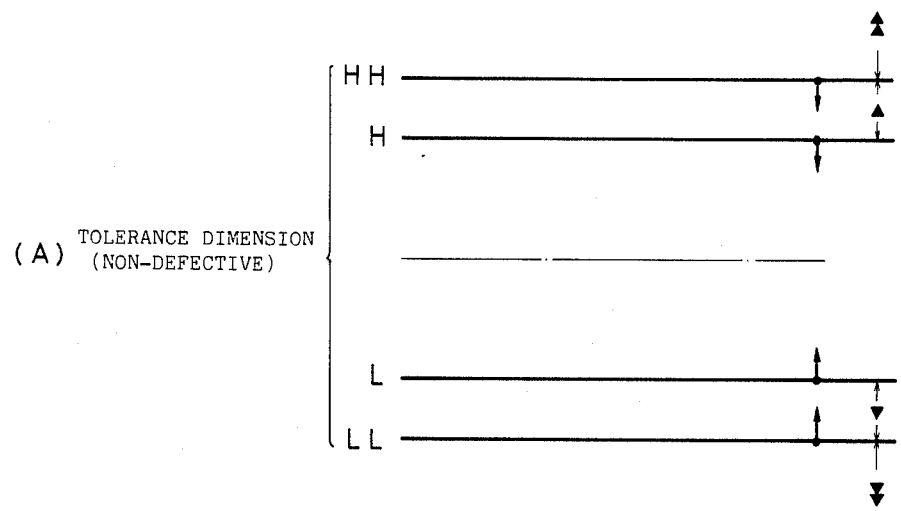
FIGS. 10A and B are explanatory views showing the limit values.
Figure 10:
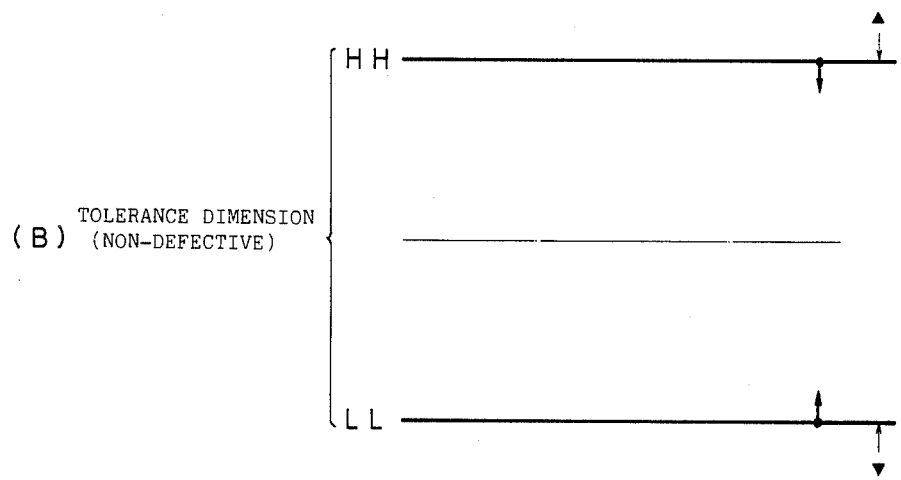

Here, when both the first upper and lower limit values HH, LL and the second upper and lower limit values H, L are set, judgments are successively made as to whether the measured length value data $D_i$ is larger than the first upper limit value HH or not, smaller than the first lower limit value LL or not, smaller than the first upper limit value HH and larger than the second upper limit value H or not, or larger than the first lower limit value LL and smaller than the second lower limit value L or not. A code " ┃ ", " ▼ ", " ▼ " or " ❢ " may be added to the measured length value data $D_i$ in accordance with the result of the judgment, and is stored by the measured length value data storing area 53A, and thereafter, control proceeds to the print process. FIG. 10(A) shows the relationship between the judging regions and the codes to be added. Furthermore, when only the first upper and lower limit values HH and LL are set, judgments are successively made as to whether the measured length value data $D_i$ is larger than the first upper limit value HH or not, or smaller than the first lower limit value LL or not. A code " ▲ " or " ▼ " may be added to the measured length value data $D_i$ in accordance with the result of judgment, and is stored by the measured length value data storing area 53A, and control proceeds to the print process. FIG. 10(B) shows the relationship between the judging regions and the codes to be added. Additionally, when both the first and second upper and lower limit values HH and LL are not set, the above-described judgments are not conducted and the measured length value data $D_i$ proceeds to the print process.

In the print process, the measured length value data $D_i$ is printed on condition that the key "A" of the print selection keys 41 is not on. In short, when the key "A" of the print selection keys 41 is pressed, the measured length value data $D_i$ is not printed. In passing, the indication of the measured length value data $D_i$ is constantly made irrespective of any of the print selection keys 41 being on or off.

Now, during the process of successively fetching the measured length value data $D_i$ by the operation of the data fetch key "DATA", when the measured length value data $D_i$, which has been fetched by the mistaken measuring operation and the like, is to be cancelled and a new measured length value data $D_i$ is to be fetched instead of the one to be cancelled for example, firstly, the cancel key "CE" is pressed and the data fetch key "DATA" is pressed in the conditions where a new work is being measured by the micrometer 1A. Then, the new measured length value data $D_i$ is renewedly stored in the storing area, into which the former measured length value data $D_i$ has been fetched. In short, the former measured length value data $D_i$ is replaced by the new measured length value data $D_i$. In consequence, a mistakenly fetched data can be rewritten by the proper data.

When the number of data i of the measured length value data $D_i$ fetched into the data processing device 2 comes to equal to $(N+1)$ as described above, quality control data can be obtained on the basis of the measured length value data $D_i$ from $i=1$ to $i=N$. Here, the maximum value $D_{max}$, the minimum value $D_{min}$, deflection range R, mean value $\bar{x}$, standard deflection S.D, and further, fraction defective FRA.D and process capability C.P are obtained from the measured length value data of the number N excluding the measured length value data $D_i$, which is fetched at the time of $(N+1)$. In this case, the mean values $\bar{X}$ and the deflection ranges R are added thereto with Nos. successively, and stored in turn by the control data storing area 55A.

In passing, the deflection range R can be sought from a difference between the maximum value $D_{max}$ and the minimum value $D_{min}$ ($D_{max} - D_{min}$). Furthermore, the mean value $\bar{X}$ can be sought through the following equation.

$$\bar{X} = \frac{\sum_{i=1}^{N} Di}{N}$$

Furthermore, the standard deflection S.D can be sought through the following equation.

$$SD = \sqrt{\frac{\Sigma(Di - \bar{X})^2}{N - 1}}$$

Additionally, the fraction defective FRA.D can be sought from a quotient obtained by dividing the number of data of the measured length value data from the first upper and lower limit values HH and LL by the number of samplings N. Further, the process capability C.P can be sought through the following equation.

$$C.P = \frac{HH - LL}{6 \times SD(N - 1)}$$

Subsequently, the maximum frequency $F_{max}$ out of the frequencies $F_j$ for all divided sections $N_{dj}$ is sought, and thereafter, this maximum frequency $F_{max}$ is divided by the number of printed places n of the printer to obtain a quotient $F_s$. Here, a coefficient of weight $C_n$ composed of an arbitrary number is selected from integers larger in value than the quotient $F_s$, thereafter, each of the frequencies $F_j$ is divided by the coefficient of weight $C_n$ thus selected to obtain respective quotients $Q_j$, and further, the minimum integer $N_j$ larger in value than these quotients $Q_j$ is determined.

Thereafter, the data of the result of statistics (here, the number of data i, the maximum value $D_{max}$, the minimum value $D_{min}$, the deflection range R, the mean value $\bar{X}$ and the standard deflection S.D) are printed on condition that the key "B" of the print selection keys 41 is not on, the histogram data (here, the first upper and lower limit values HH and LL, the number of division N, the class range, the histogram indicating the integers $N_j$ for all divided sections $N_{dj}$ in a bar graph, the frequencies $F_j$ for all divided sections $N_{dj}$) are printed on condition that the key "C" is not on, and the data including the fraction defective FRA.D, the process capability C.P and the like are printed on condition that the key "D" is not on, respectively. In other words, when the key "B" is pressed, the data of result of statistics are not printed, when the key "C" is pressed, the histogram data are not printed, and, when the key "D" is pressed, the fraction defective FRA.D and the process capability C.P are not printed, respectively. Thereafter, the measured length value data storing area 53A is cleared, the measured length value data $D_i$ fetched at the time of (N+1) is stored as the data of i=1 in the succeeding process in the measured length value data storing area 53A, set as i=1, and thereafter, printed.

On the other hand, at an arbitrary time before the number of data i of the measured length value data fetched into the data processing device 2 reaches N+1, when the print key "PRINT" is pressed, the statistical processing and the histogram processing are conducted in the same manner as in FIG. 9. With this arrangement, at an intermediate time before the number of data i of the measured length value data fetched into the data processing device 2 reaches N+1, the statistical processing and the histogram processing can be conducted.

Now, as for the control charts $\overline{X}$, R and the like, normally, the measuring operation is conducted every several days, and these control charts are prepared from the data thus measured. In this case, when the number of samplings N during one time of measuring is set at 4–6, for example at 5, and the measured length value data $D_i$ is successively fetched every time, in the control data storing area 55A, there are successively stored the means value $\overline{X}$ and the deflection range R of the measured length value data $D_i$ successively fetched with every set No. On the other hand, the micrometer 1B is selected by the measuring instrument selection switch 40, and thereafter, in this micrometer 1B, when the setting operation and the measuring operation are conducted in the same steps as described above, in the control data storing area 55A, there are successively stored the mean value $\overline{X}$ and the deflection range R of the measured length value data $D_i$ of the number of samplings N preset with every set No.

Figure 11:
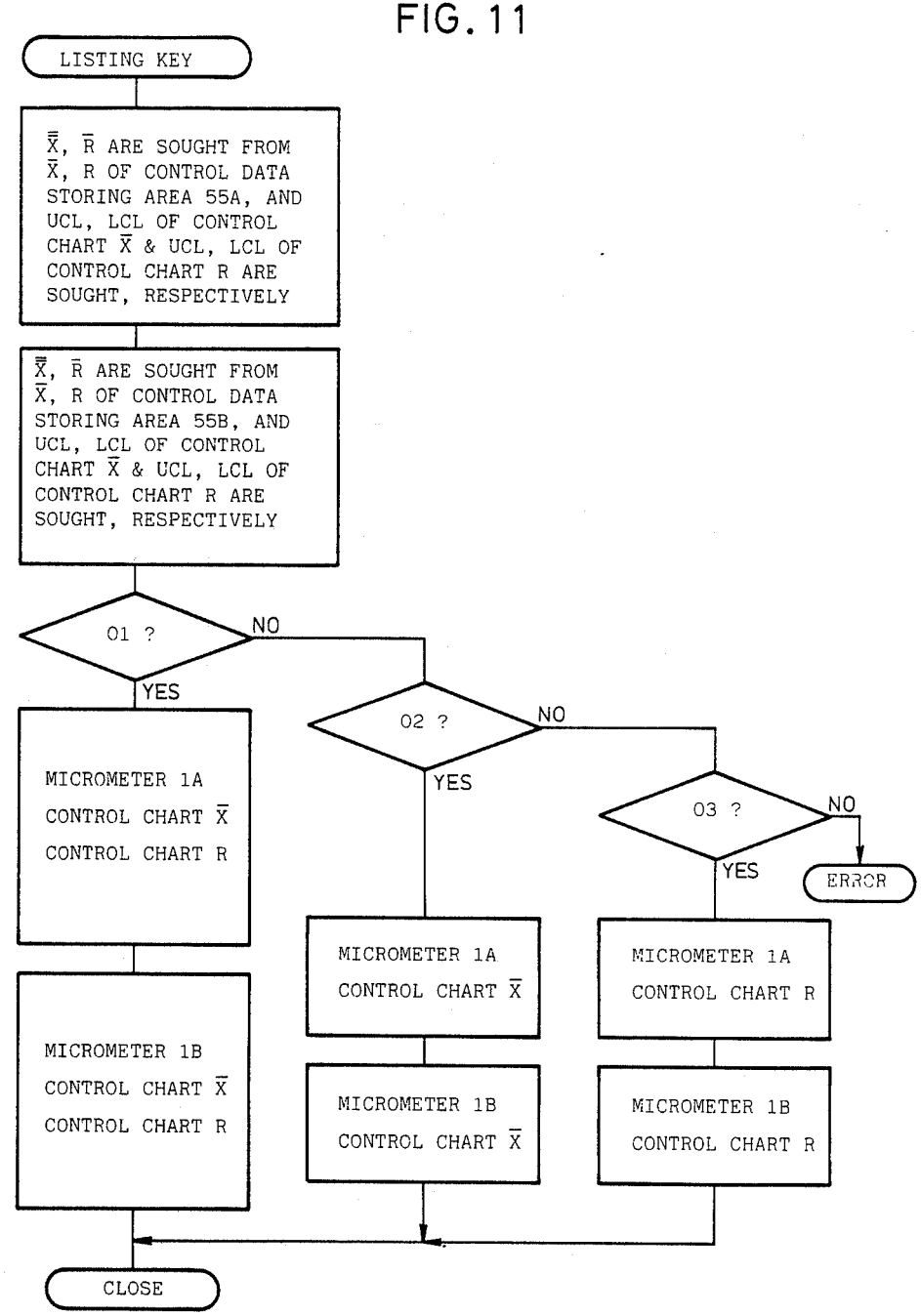
FIG. 11 is a flow chart showing the operations of the listing key.

Here, when it is desired to continuously output the control charts $\overline{X}$ and R of the parts measured by the micrometer 1A and the control charts $\overline{X}$ and R of the parts measured by the micrometer 1B, "01" code is inputted and the listing key "FIG" is pressed, when it is desired to continuously output the control charts $\overline{X}$ of the parts measured by the both micrometers 1A and 1B, "02" code is inputted and the listing key "FIG" is pressed, and, when it is desired to continuously output the control charts R of the parts measured by both micrometers 1A and 1B, "03" code is inputted and the listing key "FIG" is pressed. Then, in the control circuit 36, the processing is conducted in accordance with the flow chart shown in FIG. 11.

That is to say, a mean value X of mean values $\overline{X}_1$-$\overline{X}_k$ and a mean value $\overline{R}$ of deflection ranges $R_1$-$R_k$ as stored in the control data storing area 55A are sought, respectively, and thereafter, an upper control limit UCL and a lower control limit LCL of the control chart $\overline{X}$ and an upper control limit UCL and a lower control limit LCL of the control chart R are sought, respectively. Subsequently, a mean value X of mean values $\overline{X}_1$-$\overline{X}_k$ and a mean value $\overline{R}$ of deflection ranges $R_1$-$R_k$ as stored in the control data storing area 55B are sought, respectively, and thereafter, an upper control limit UCL and a lower control limit LCL of the control chart $\overline{X}$ and an upper control limit UCL and a lower control limit LCL of the mean values X and $\overline{R}$ can be sought through the following equations, respectively.

$$\overline{\overline{X}} = \frac{\epsilon \overline{X}}{k} \quad \overline{R} = \frac{\epsilon R}{k}$$

where $\Sigma X$ is a sum of $\overline{X}_1$-$\overline{X}_k$, $\Sigma R$ is a sum of $R_1$-$R_k$ and k is a number of sets. Furthermore, the upper control limit UCL and the lower control limit LCL of the control chart $\overline{X}$ can be sought through the following equations, respectively.

$$UCL = \overline{\overline{X}} + A_2\overline{R}$$

$$LCL = \overline{\overline{X}} - A_2\overline{R}$$

Additionally, the upper control limit UCL and the lower control limit LCL of the control chart R can be sought from the following equations, respectively.

$$UCL = D_4\overline{R}$$

$$LCL = D_3\overline{R}$$

$A_2$, $D_3$ and $D_4$ are coefficients determined by the magnitude of sets (the number of samplings N) and preset.

Figure 12:
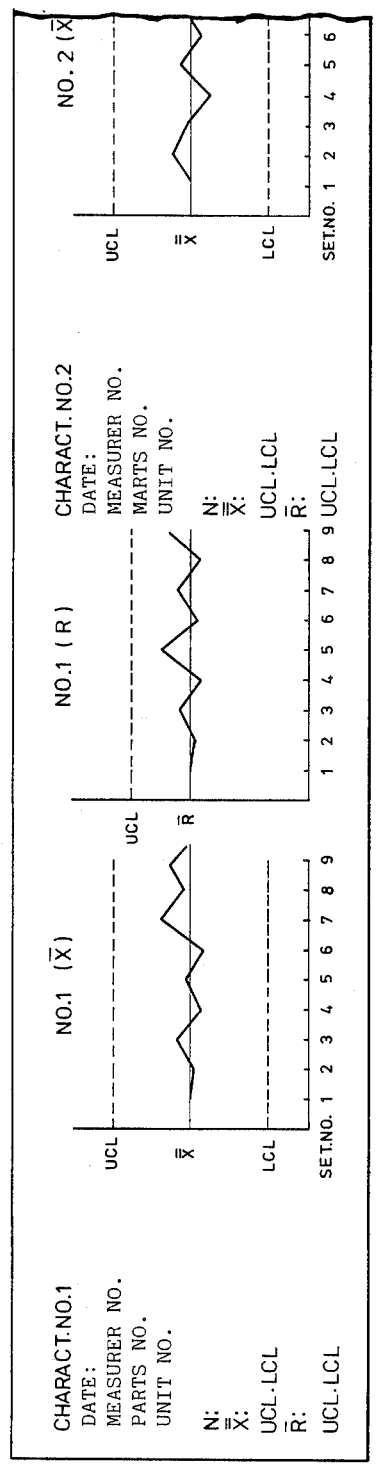
FIGS. 12 to 14 are samples of the control charts printed out.

Subsequently, judgment is made as to which of the three "01", "02" and "03" is the code data inputted before the listing key "FIG". Here, when the code data is "01", the various data such as the date and measurer No. as stored in the set data storing area 52A and the results of calculations ($\overline{\overline{X}}$, UCL, LCL, $\overline{R}$, UCL and LCL) are printed, and thereafter, the control charts $\overline{X}$ and R of the parts measured by the micrometer 1A are successively printed on the basis of the results of calculations and the respective data stored in the control data storing area 55A. Subsequently, the various data such as the data, measurer No. and the like as stored in the set data storing area 52B and the results of calculations (X, UCL, LCL, $\overline{R}$, UCL and LCL) are printed, and thereafter, the control charts $\overline{X}$ and R of the parts measured by the micrometer 1B are successively printed on the basis of the results of calculations and the respective data stored in the control data storing area 55B. In this case, the chart making data of these control charts are edited in a predetermined format in such a manner that the set Nos. are indicated in a direction of forwarding a form and the control data are indicated in a direction perpendicularly intersecting the direction of forwarding the form, i.e. the widthwise direction of the form, and thereafter, outputted to the printer 33. In consequence, these control charts are outputted in a format shown in FIG. 12.

Figure 13:
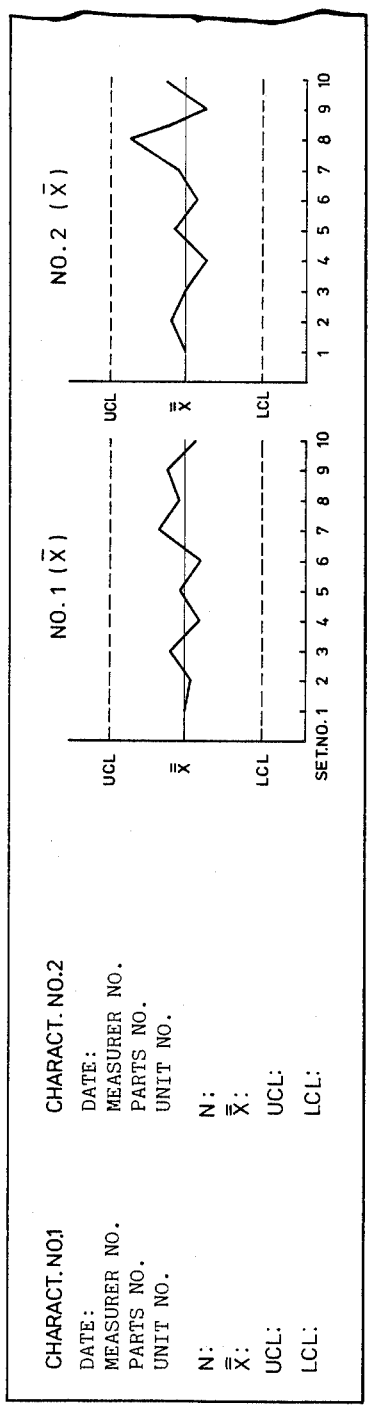

Furthermore, when the code data is "02", the various data stored in the set data storing areas 52A and 52B and the results of calculations ($\overline{\overline{X}}$, UCL and LCL) are successively printed, and thereafter, the control chart $\overline{X}$ of the parts measured by the micrometer 1A is printed on the basis of the results of calculations and the mean value $\overline{\overline{X}}$ in the control data storing area 55A. Subsequently, the control chart $\overline{X}$ of the parts measured by the micrometer 1B is printed on the basis of the mean value $\overline{\overline{X}}$ in the control data storing area 55B. In consequence, the format shown in FIG. 13 is outputted.

Figure 14:
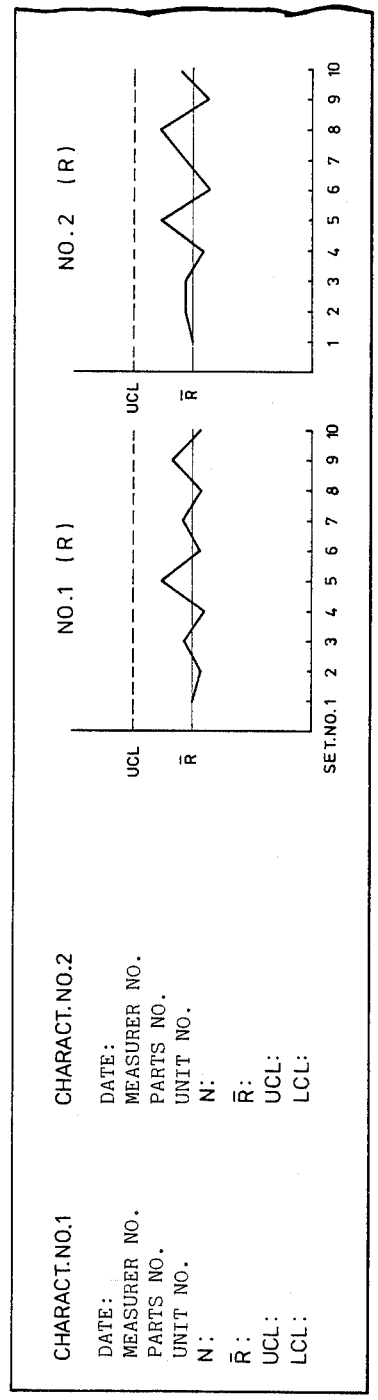

Further, when the code data is "03", the various data stored in the set data storing areas 52A and 52B and the results of calculations ($\overline{R}$, UCL and LCL) are successively printed, and thereafter, the control chart R of the parts measured by the micrometer 1A are printed on the basis of the results of calculations and the deflection range R in the control data storing area 55A. Subsequently, the control chart R of the parts measured by the micrometer 1B is printed on the basis of the deflection range R in the control data storing area 55B. In consequence, the format shown in FIG. 14 is outputted.

In consequence, according to this embodiment, the data processing device 2 is formed separately of the micrometers 1A and 1B, the data processing device and the micrometers are data-interchangeably connected to each other by the signal transmitting cable 3, in the micrometers 1A and 1B, the measured length mode information, measured length value information, sign information, decimal point position information, length measuring unit and pass or fail judging information are converted into BCD coded signals in response to data fetch commands from the data processing device 2, and thereafter, the BCD coded signals are transmitted to the data processing device 2 in the bit serial manner in synchronism with the clock pulses from the data processing device 2, whereby the micrometers 1A and 1B are usable as the conventional length measuring instrument as they are, so that the measuring operation itself need not be changed at all, i.e. no acquirement of special technique is needed, and the characteristic features of compactness in size and high controllability can be maintained. Moreover, with the above-described arrangement, the micrometer is independently usable.

Furthermore, the measured length value data are directly inputted to the data processing device 2, whereby no errors due to copying occur, so that accurate quality control data can be rapidly and efficiently obtained. In obtaining the data, no particularly large-sized computer is needed, so that there is no possibility of lowered operating efficiency. Further, the data transmission is made to be the clock pulse serial transmission of BCD codes, so that the data in a large quantity can be transmitted at high speed, thereby enabling to construct the circuit compact in size and simplified.

The quality control data can be obtained at the spot of measuring, so that the process capability of the production line and the like can be judged instantaneously, and particularly, tool replacement and the like can be immediately carried out. Moreover, the data fetch key "DATA" is provided on the side of the data processing device 2, so that a possibility of fetching wrong measured length value data due to mistaken operations during the measuring can be eliminated.

The upper and lower limit values of the tolerance dimension against the reference dimension of the work are set as the upper and lower limit values HH and LL, and the second upper limit value H and second lower limit value L are provided within the tolerance dimension rather than the first upper and lower limit values HH and LL, the pass or fail of the measured length value data given by the micrometers 1A and 1B are judged on the basis of these upper and lower limit values, judgment of the non-defectives from the defectives and further judgment of the transitional conditions between the non-defectives and the defectives can be facilitated. Additionally, if an alarm is given when a preset number of the measured length value data $D_i$ are continuously present within the range between the first upper and lower limit values HH and LL and the second upper and lower limit values H and L, then tool replacement or adjustment can be conducted at a time before defectives in a large quantity are worked on.

Such an arrangement is adopted that, each time the data fetch key "DATA" is pressed, it is judged as to which divided section $N_{dj}$ of the tolerance dimension equally divided by the number of division $N_j$ the measured length value data $D_i$ thus fetched belongs to, the frequencies $F_j$ of the measured length value data $D_i$ belonging to the respective divided sections $N_{dj}$ are counted up, these data are processed in a predetermined manner, so that these data can be received within the printing places of the printer at a time when the number i of the measured length value data $D_i$ reaches a predetermined value, and thereafter, the result is indicated as a histogram corresponding to the frequencies, whereby distributions of accuracies of the measured length value data of a group of works and conditions of change thereof can be judged at a glance, so that the measuring of a certain amount of products to be worked on can be omitted, or the number of samplings thereof can be reduced, and further, the indication can be utilized as the data for adjustment of the machines for the working. Furthermore, it brings about such an advantage that no high judging capacity is required from the operator.

The statistic data such as the mean value $\overline{X}$, deflection range R and standard deviation S.D and the quality control data such as the fraction defective FRA.D, process capability exponent C.P are automatically sought from the measured length value data $D_i$ thus fetched, so that these data can be prepared easily and rapidly.

Furthermore, when the number i of the measured length value data $D_i$ reaches the number (N+1) obtained by adding 1 to the present number of samplings N, the statistical processing and histogram processing are automatically conducted on the basis of the data obtained by the time of N, whereby even when a wrong measured length value data $D_i$ is fetched due to the mistaken measuring operation having occurred at the time of N, such for example as misunderstanding of the surface to be measured, improper abutment between the members, varied measuring force and the like, a new measured length value data is fetched after the former measured length value data is cancelled, and automatic processing is conducted when the succeeding (N+1) measured length value data is fetched, so that the quality control data can be sought on the basis of the proper data all the times, without including any wrong measured length value data. Moreover, the data at the time of N+1 is stored as the first data of the succeeding process, and printed, so that necessity of renewed measuring is eliminated.

On the other hand, the print key "PRINT" is provided, and, when this print key "PRINT" is operated, the statistical processing and histogram processing are automatically conducted, so that these processings can be conducted when the number of data i is arbitrary. In consequence, when the number of samplings N is large and as large as about 1000 for example, it is not necessary to wait until the number of data i reaches the number of samplings N, the statistic data and histogram data at the intermediate time can be obtained at an arbitrary time. Moreover, the processings can be conducted within the width of the form, in which the histogram is used, so that, even if the width of the form of the printer is different, the histogram can be indicated over the full width of the different form, thus being easily readable.

Furthermore, the mean value $\overline{X}$ and deflection range R of the measured length value data $D_i$ of the number of samplings N, which are added thereto with set Nos., are successively transmitted to the control data storing areas 55A and 55B and stored, and, when the listing key "FIG" is pressed, the control charts $\overline{X}$ and R are automatically outputted on the basis of the mean value $\overline{X}$ and deflection range R as stored in these control data storing areas 55A and 55B, so that these control charts can be prepared very easily and rapidly. Moreover, in preparing these control charts, the set Nos. are indicated in a direction of forwarding a form and the control data are indicated in a direction perpendicularly intersecting the direction of forwarding the form, i.e. the width-wise direction of the form, namely, the set Nos. being non-qualitative are indicated in the direction of forwarding the form and the control data being qualitative are indicated in the widthwise direction of the form whose width is predetermined, respectively, so that the processing of receiving these data within a predetermined form can be simplified.

Further, a plurality of micrometers 1A and 1B are connected to the data processing device 2 and the control charts $\overline{X}$ and R with each micrometer 1A or 1B and the control charts identical in type with each other with each micrometer 1A or 1B can be selectively outputted, so that, if any one of several outputs is specified, a necessary control chart or charts can be outputted in the most easily readable forms.

Furthermore, during the setting operation before the start of measuring, if the date, measurer No., parts No., unit No. and the like are inputted, then they are printed in a form, whereby the contents of these prints can be conveniently utilized as indexes for the data during the subsequent preparation of the quality control data or keeping thereof. On the other hand, the print selection keys 41 are provided, and, when any one of these keys is previously turned on, the print data corresponding to the key being on is not printed, whereby, with no key being operated, all of the contents can be printed out in a predetermined sequence, so that key operation is very easy and the working is quickly done because no selective combination of ones for printing is required.

In the above embodiment, there is shown the example where two micrometers 1A and 1B are used as the length measuring means, however, as the measuring means, one micrometer or three micrometers or more may be used. Furthermore, instead of the micrometer, a measuring instrument such as slide calipers, dial gauge and height gauge may be used and signals from any of these measuring instruments can be directly inputted to the data processing device 2. In passing, in the dial gauge and the like, a movement value of a spindle may be detected as an electric signal, and, in slide calipers, height gauge and the like, a movement value of a slider may be detected as an electric signal. Moreover, in a measuring instrument having the maximum and minimum hold function out of these measuring instruments, the code specifying the type may be set in a length measuring mode identifying code, and, in a measuring instrument having the pass or fail judging function, the unit code including the pass or fail judging data may be set in a unit and pass or fail judging code.

Furthermore, as the encoder for detecting these movement values, in addition to the ones of photoelectric types by use of the main scale and index scale as described in the above embodiment, there may be applied various types such for example as a magnetic scale type, capacitance type, contact point type, resistance type and laser type.

In the above embodiment, the data fetch key is provided only on the side of the data processing device 2, however, both the data fetch key and the data processing device 2 may be provided on the side of the length measuring means of the micrometer or the like. Further, in the slide calipers or micrometer, if a piezoelectric element is provided on either one of the contact members brought into engagement with the work, the aforesaid respective data may be fetched in response to detection signals when a predetermined value of measuring force is applied to this piezo-electric element. In this case, in the height gauge and the like, a touch signal probe rather than the piezo-electric element is preferable. Further, as the recording means of the respective data, a CRT, recorder or the like may be used for example, except the printer.

In the above embodiment, when the number of data i of the measured length value data $D_i$ reaches $N+1$, the calculations of the result of statistics and the like are automatically started, however, any one will do only if the value is $N+1$ or more. Further, the date, measurer and the like are inputted from the keyboard, and further, recorded in a magnetic card or the like, and the card may be inserted into the data processing device 2 for reading. In addition, when any one of the print selection keys 41 is turned on, only the necessary data may be specified by a key or the like, which can point out only the necessary data, without excluding the print out of the data corresponding to the selected key or the print selection keys 41.

Further, as for the control charts, except the control charts $\overline{X}$ and R as described in the above embodiment, control charts $\overline{X}$ and S (S: standard deflection) may be used. If multi-color pens are used in the printer 33, then the control charts may be printed in colors. Further, as for at least the data stored in the control data storing areas 55A and 55B, the countermeasure can be provided of not allowing the stored data to be lost, even when the power is out owing to the failure of power supply and the like. In addition, the upper control limit UCL and lower control limit LCL of the control charts $\overline{X}$ and R are obtained by calculations, and further, the predetermined values may be imputted from the keyboard.

Figure 15:
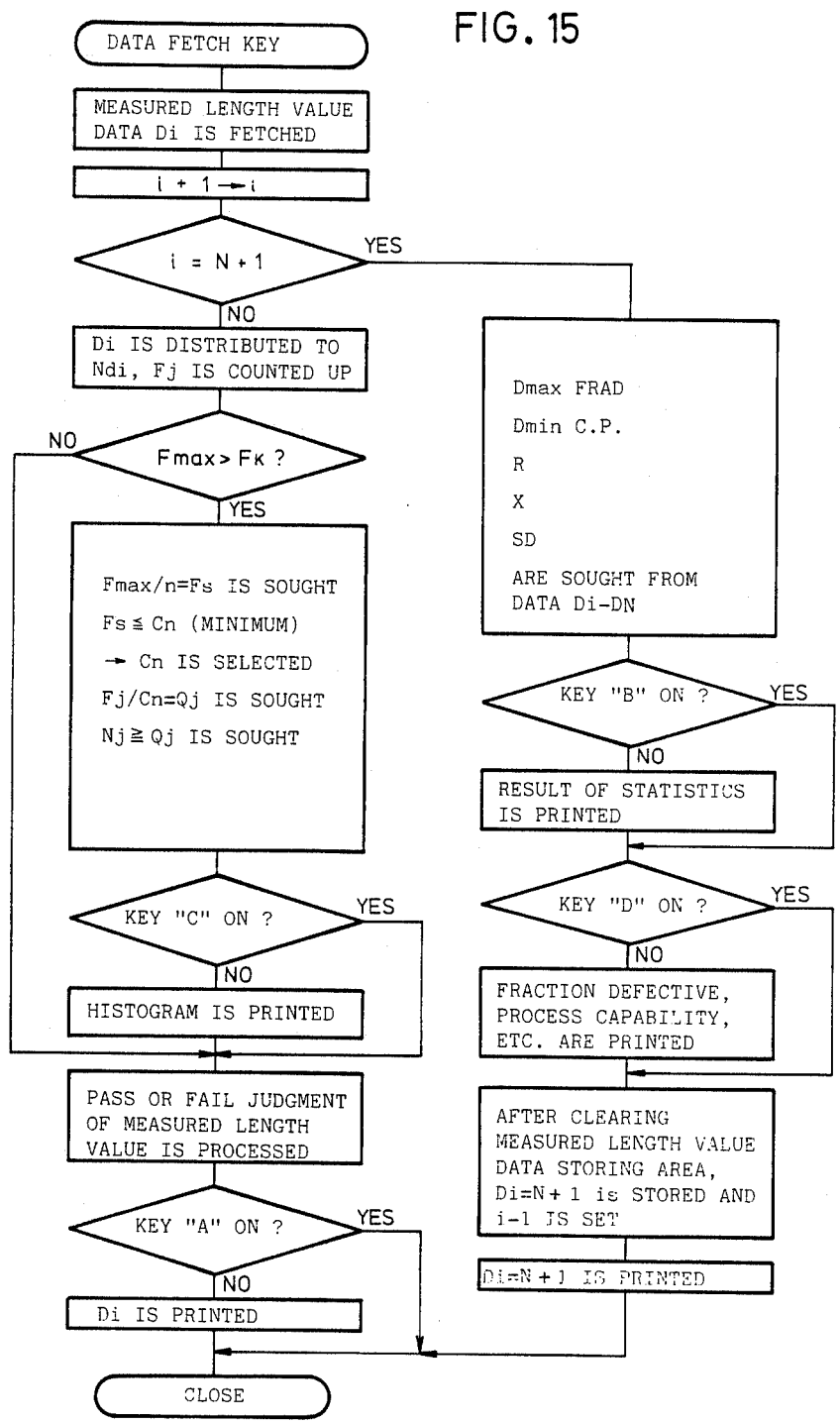
FIG. 15 is a flow chart showing another example of the operations initiated by the data fetch key.

In the above embodiment, the condition for causing the processing of the histogram data to be started at an arbitrary number of data i, i.e. an output starting condition, has been the time when the print key "PRINT" is pressed, however, the processing of the histogram data may be conducted each time the measured length value data $D_i$ is fetched for example. Further, as shown in FIG. 15, after the frequency $F_j$ corresponding to the divided section $N_{dj}$, to which the measured length value data $D_i$ fetched belongs, is counted up by $+1$, and the maximum frequency $F_{max}$ out of the frequencies $F_j$ of the respective divided sections $N_{dj}$ is calculated, the processing of the histogram data may be conducted on condition that the maximum value $F_{max}$ exceeds a variably set number $F_k$, which can be arbitrarily set. With the above-described arrangement, as compared with a method of conducting the processing each time the measured length value data is fetched as aforesaid, the processing of the histogram data need not be conducted until the maximum frequency $F_{max}$ exceeds the variably set frequency $F_k$, so that the data processing can be simplified and the processing time period can be shortened. Moreover, if the variably set frequency $F_k$ is set in accordance with the maximum print number of the width of the form of the printer 33, then the histogram data can be renewed and processed at the maximum frequency before the maximum frequency $F_{max}$ exceeds the maximum print number of the width of the form.

Furthermore, as the histogram indication, except the bar graph indication described in the above embodiment, marks having the number corresponding to the integers $N_j$ of the respective divided sections $N_{dj}$ such for example as "*", character, figure, combination of those or the like may be used.

As has been described hereinabove, the present invention can provide a digital indication type length measuring system capable of generating quality control data efficiently and accurately without hampering the characteristic features of being compact in size and easy in handling.

What is claimed is:

1. A digital indication type length measuring system, comprising: at least one length measuring means having a measuring element which can be successively brought into contact with a plurality of workpieces to be measured, having a digital indicator, and having means for causing said digital indicator to display for each of the workpieces a respective displacement value representative of the position of said measuring element when in contact with such workpiece and with respect to a reference position of said measuring element; and data processor means which is separate from and connected by a cable to said length measuring means and which has indicator means for indicating each said displacement value of the measuring element; wherein said length measuring means includes encoder means responsive to movement of said measuring element for producing an electric signal representative of each said displacement value of said measuring element, and includes output circuit means responsive to said electric signal from said encoder means for outputting onto said cable information representative of each said displacement value; wherein said data processor means includes input circuit means for receiving said information from said output circuit means through said cable, processing means for calculating quality control data from the information received by said input circuit means, said quality control data including a histogram, and printer means for printing out on an elongate sheet of paper the quality control data from said processing means, said printer means printing said histogram on the paper in a size corresponding to a width of the paper; and wherein said information outputted onto said cable by said output circuit means includes: a measured displacement value, sign information specifying that said measured displacement value is one of a positive and negative number, decimal point position information specifying where a decimal point is to be placed in said measured displacement value, and information specifying a unit of measure in which said measured displacement value is expressed.

2. A system according to claim 1, including a further length measuring means which is connected to said data processor means by a further cable, wherein said data processor means includes a selection key which can select one of said length measuring means, and wherein said input circuit means is responsive to said selection key for receiving information only from the length measuring means currently selected by said selection key.

3. A system according to claim 2, wherein said processing means includes a control circuit having a storage section, said storage section including for each said length measuring means a set data storing portion, a measured displacement value data storing portion, a processing data storing portion, and a control chart data storing portion.

4. A system according to claim 1, wherein said processing means includes means for storing a plurality of said displacement values from said length measuring means, and includes means for calculating from said plurality of displacement values: a maximum value, a minimum value, a range, a mean value, a standard deflection and a process capability exponent.

5. A system according to claim 1, wherein said quality control data includes a chart having a first axis representing data values and a second axis perpendicular to said first axis representing sets of data, and wherein said printer means prints said chart with an orientation so that said first and second axes are respectively perpendicular and parallel to a direction of movement of said paper through said printer means.

6. A system according to claim 1, wherein said processing means includes means for storing data from a preset number of successive transmissions of information across said cable from said output circuit means, and for thereafter automatically carrying out said calculation of quality control data using said stored data from said preset number of transmissions.

7. A digital indication type length measuring system, comprising: at least one length measuring means having a measuring element which can be successively brought into contact with a plurality of workpieces to be measured, having a digital indicator, and having means for causing said digital indicator to display for each of the workpieces a respective displacement value representative of the position of said measuring element when in contact with such workpiece and with respect to a reference position of said measuring element; and data processor means which is separate from and connected by a cable to said length measuring means and which has indicator means for indicating each said displacement value of the measuring element; wherein said length measuring means includes encoder means responsive to movement of said measuring element for producing an electric signal representative of each said displacement value of said measuring element, and includes output circuit means responsive to said electric signal from said encoder means for outputting onto said cable information representative of each said displacement value; wherein said data processor means includes input circuit means for receiving said information from said output circuit means through said cable, processing means for calculating quality control data from the information received by said input circuit means, said quality control data including a histogram, and printer means for printing out on an elongate sheet of paper the quality control data from said processing means, said printer means printing said histogram on the paper in a size corresponding to a width of the paper; wherein successive transmissions of information sent across said cable by said output circuit means each include a measured displacement value; and wherein said processing means includes means for storing preset upper limit and lower limit values which bound a range of values containing a reference value of a particular workpiece dimension to be measured and for storing a preset division number identifying a number of equal sections into which said range is divided, and includes means for determining which said section of said range each said measured displacement value data belongs to, for determining and storing the frequency of the measured displacement values for each said section, for determining the maximum frequency of said section frequencies, for thereafter calculating a first quotient by dividing said maximum frequency by a predetermined number, for thereafter calculating for each said section a respective second quotient by dividing the frequency for such section by a coefficient of weight which is an integer larger in value than said first quotient, and for thereafter determining for each said section the minimum integer which is larger in value than the second quotient, said histogram showing for each of said sections the corresponding minimum integer.

8. A system according to claim 7, wherein said data processor means includes listing means for generating control charts which include a mean value and a range calculated from said information sent by said output circuit means of said length measuring means.

9. A system according to claim 7, wherein said data processor means includes a switch, and wherein said processing means is responsive to actuation of said switch for initiating said determination of said maximum frequency, said first and second quotients and said minimum integers, and for causing said printer means to print said histogram.

10. A system according to claim 7, wherein said data processor means includes means responsive to said maximum frequency being greater than a preset frequency for initiating said calculation of said first and second quotients and said minimum integers, and for causing said printer means to print said histogram.

11. A system according to claim 7, wherein said output circuit means transmits information across said cable in binary coded decimal form.

* * * * *